United States Patent [19]

Suay Puig

[11] Patent Number: 4,765,746

[45] Date of Patent: Aug. 23, 1988

[54] DOUGH KNEADER

[76] Inventor: Enrique Suay Puig, Vincente Lerma, No. 26, 46980- Paterna (Valencia), Spain

[21] Appl. No.: 16,219

[22] Filed: Feb. 19, 1987

[30] Foreign Application Priority Data

Feb. 20, 1986 [ES] Spain ................................. 292402

[51] Int. Cl.$^4$ ........................... B28C 1/16; B28C 7/16
[52] U.S. Cl. ........................................ 366/77; 366/79;
366/95; 366/187; 366/196; 366/197
[58] Field of Search ..................... 366/42, 44, 53–56,
366/77, 79, 187, 188, 194, 196, 197, 200, 201,
206, 224, 92–95

[56] References Cited

U.S. PATENT DOCUMENTS

| | | | |
|---|---|---|---|
| 883,064 | 3/1908 | Valerius | 366/213 X |
| 2,239,337 | 4/1941 | Nye | 366/196 |
| 4,166,705 | 9/1979 | Fronske | 366/224 X |

Primary Examiner—Timothy F. Simone
Attorney, Agent, or Firm—St. Onge Steward Johnston & Reens

[57] ABSTRACT

A kneader which comprises a main body, which forms a support structure, part of the main body constituting a support for a bowl or receptacle; a rotatable helix mounted on the main body so as to extend into the bowl or receptacle, the helix being connected to appropriate drive means which effect rotation of the helix about its axis in either a clockwise or counter-clockwise direction, the arrangement being such that when the helix is rotated in one direction material within the bowl is kneaded and when rotated in the opposite direction of rotation the kneaded material is lifted upwardly out of the bowl by the helix; the kneader being further provided with means for guiding the kneaded material over the edge of the bowl or receptacle so as to effect removal of the kneaded material from the kneader.

20 Claims, 2 Drawing Sheets

DOUGH KNEADER

DISCLOSURE OF INVENTION

The present invention relates to a dough kneader for use in making dough products, such as bread.

According to the present invention there is provided a kneader comprising a main body which forms a support structure, part of the main body constituting a support for a bowl or receptacle; a rotatable helix mounted upon the main body so as to extend into the bowl or receptacle when the bowl or receptacle is positioned upon the support, drive means for rotating the helix about its axis, said drive means being capable of driving the helix in either a clockwise or counter-clockwise direction or rotation so that with one rotation the helix can lift kneaded material out of the bowl or receptacle, means also being provided for guiding the material over the edge of the bowl or receptacle in order to effect removal of the kneader material from the kneader.

Preferably the guide means are in the form of a drum rotatably mounted upon the main body of the kneader so that in use the kneaded material is engaged by the drum when it is lifted out of the bowl or receptacle by the helix and is guided out of the bowl or receptacle by the rotation of the drum.

Conveniently, the drum is mounted upon the main body of the kneader adjacent a shaft or journal by way of which the helix is mounted upon the main body, such that part of the periphery of the drum extends beyond the periphery of the bowl or receptacle when the bowl or receptacle is positioned upon the support, the drum and the helix being adapted so as to co-rotate.

The kneader may further comprise a member for removing the kneaded material from the guide means. The removing member may take the form of a blade mounted upon the main body of the kneader such that the blade is positioned adjacent said guide means.

Advantageously the blade is arranged in a vertical orientation, a surface of the blade being inclined at an angle to the outer surface of the guide means. The blade may be of substantially triangular cross-section.

The kneader may additionally comprise a support member of supporting kneaded material upon removal thereof from the kneader.

Conveniently the support member is in the form of a planar member mounted upon the main body of the kneader so as to extend adjacent a rim of the bowl or receptacle, when the bowl or receptacle is mounted in position on the support, the planar member extending in the same plane as an opening defined by the rim of the bowl or receptacle.

Preferably the kneader further comprises a rigid finger secured to a part of the main body so as to extend into the bowl or receptacle when the bowl or receptacle is positioned upon the support.

Conveniently the rigid finger is secured to the main body of the kneader so as to extend into the bowl or receptacle in a direction parallel to the axis of rotation of the helix, the finger being adjacent the helix.

Preferably the kneader comprises a drive means to rotate the bowl or receptacle.

BRIEF DESCRIPTION OF DRAWINGS

In order that the present invention may be more readily understood and so that further features thereof may be appreciated, the invention will now be described by way of example, with reference to the accompanying drawings, in which.

BEST MODE FOR CARRYING OUT THE INVENTION

Figure 1:
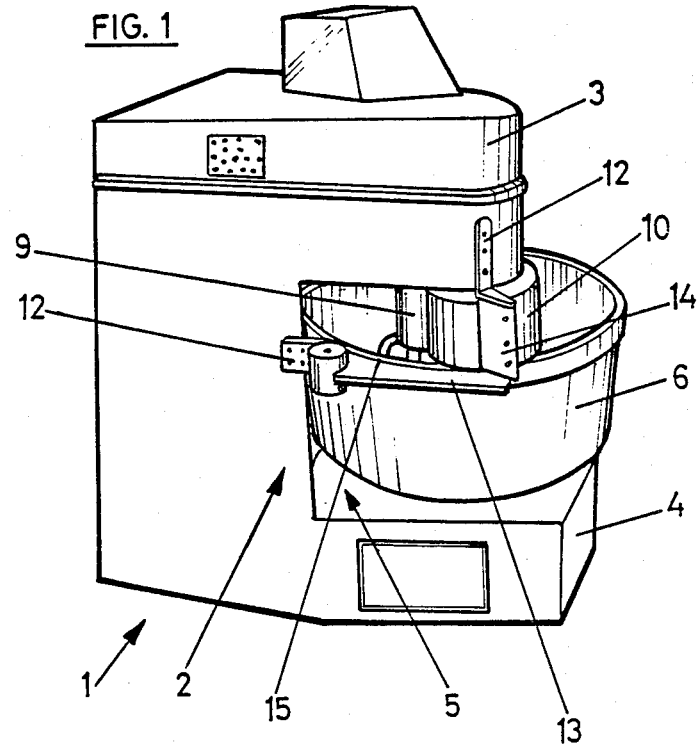
FIG. 1 is a side view in perspective of a kneader in accordance with the present invention.

Referring to FIG. 1 of the drawings a kneader 1 comprises a main body 2 having a vertical, upright portion of prismatic cross-section provided at its upper end with a horizontal arm 3 and at its lower end with a horizontal support plate or base 4 which is parallel to the arm 3. Between the extension 3 and the base 4 is a central recess 5, within which a receptacle or bowl 6 is received. The base 4 forms a support for the bowl 6. The bowl 6 is connected to a drive unit housed within the main body 2 so as to be rotatably driven by the drive unit either in a clockwise direction or in a counter-clockwise direction.

Figure 2:
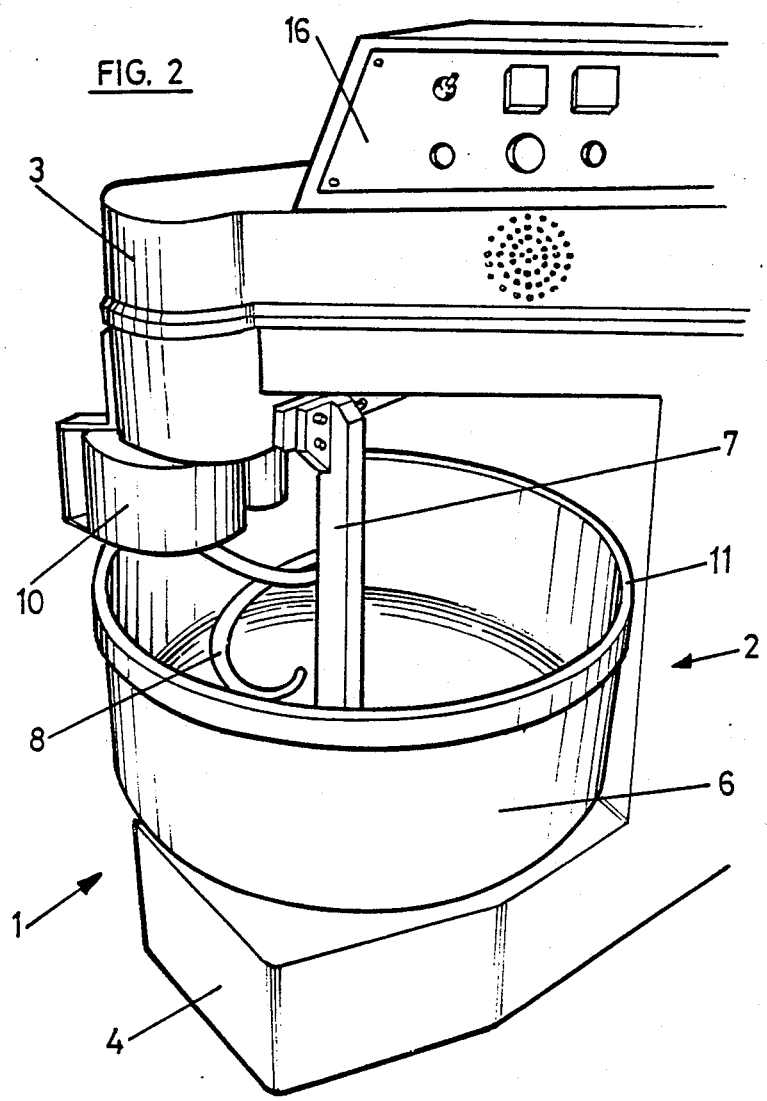
FIG. 2 is a side view of the other side of the kneader of FIG. 1.

As can be seen most clearly in FIG. 2, a rigid, vertically extending finger 7 is secured to the upper arm 3 and extends downwardly into the bowl 6. The finger 7 extends into the bowl 6 along the axis about which the bowl 6 may rotate.

Also mounted on the upper arm 3 is a depending helix 8. The helix 8 is located on the underside of the arm 3 by means of a journal 9 to which it is attached (the journal 9 may be more clearly seen in FIG. 1). The helix 8 extends downwardly into the bowl 6 at a position adjacent the finger 7 and journal 9 is connected to an appropriate drive within the main body 2 of the kneader so that the helix 8 can be rotated in either a clockwise or counter-clockwise direction.

A cylindrical drum 10 is rotatably mounted on the underside of the upper arm 3 at a position directly adjacent the journal 9 to which the helix 8 is attached. The axis of rotation of the cylindrical drum 10 extends parallel to that of the journal 9. The drum 10 is connected to an appropriate transmission unit so as to co-rotate with the helix 8, in the same rotational sense. The length of the drum 10 is such that the lower edge thereof is located slightly above the plane of the opening defined by a rim 11 at the top of the bowl 6. The drum 10 is arranged on the underside of the arm 3 so that a part of the outer periphery of the drum 10 extends beyond the rim 11 of the bowl.

Referring back to FIG. 1, it can be seen that brackets 12 serve to secure a support member 13 and a blade 14 on the main body 2 of the kneader. The support member 13 is a plate having a planar upper surface which is co-planar with the opening defined by the rim 11 at the top of the bowl 6. The member 13 is located immediately adjacent the rim 11 of the bowl 6 and has an inner surface 14 which is of arcuate configuration and shaped to correspond to the shape of the outer periphery of the rim 11 of the bowl 6. The support member 13 serves to support material which is being removed from the bowl 6 after having been kneaded, as will be explained more fully hereinafter.

The blade 14 is mounted in a vertical position so that an inner edge of the blade 14 is located in very close proximity to the outer periphery of the cylindrical drum 10, at a position where the periphery of the drum 10 is not located beyond the bowl 6. The blade 14 extends vertically along the length of the drum and is inclined relative to the periphery of the drum so that the surface of the blade 14 is inclined at an angle to the outer surface of the drum. The blade 14 is of substantially triangular cross-section, a broad edge of the blade being located adjacent the drum 10. The blade 14 serves, in use, to remove material from the cylindrical drum 10 as the material is being removed from the bowl 6 after having been kneaded.

A control panel 16 (see FIG. 2) is provided on the upper surface of the arm 3 and incorporates switches, buttons and the like for operating the kneader.

In use, ingredients such as flour, water, etc for making a dough product are introduced into the bowl 6 and the kneader is switched on.

Switching on the kneader causes the helix 8 to rotate clockwise when viewed from above and the bowl 6 to be rotated by their respective drive means and this results in the blending together of the ingredients in the bowl 6. Once the ingredients have been adequately kneaded the machine is then switched so that helix 8 rotates in the opposite direction and so that the drum 10 also rotates. This reverse direction of rotation causes the kneaded material in the bowl 6 to rise axially up along the helix 8 towards the opening at the top of the bowl. When the kneaded material reaches journal 9, which is located above the opening at the top of the bowl, it engages the periphery of the drum 10, and is drawn from the journal 9 by the drum 10. The dough is then guided substantially radially outwardly by the cylindrical drum 10 which co-rotates with the helix 8. The kneaded material is supported by the support member 13 as it passes over the rim 11 of the bowl 5 and is removed from the cylindrical drum 10 by means of the blade 14. The dough then falls from the described mixing apparatus and can be caught by an appropriately located container. Thus the kneader affects an automatic removal of the kneaded material from the bowl 6.

It will be appreciated that many modifications and alterations of the above described embodiment of kneader may be made within the scope of the present invention.

I claim:

1. A kneader comprising a main body which forms a support structure, part of said main body constituting a support for a bowl or receptacle; a rotatable helix mounted upon said main body so as to extend into said bowl or receptacle when said bowl or receptacle is positioned upon said support; drive means for rotating said helix in either a clockwise or counter-clockwise direction of rotation, such that with rotation in a first direction said helix can knead material in said bowl or receptacle and rotation in a second direction said helix can lift kneaded material out of said bowl or receptacle; and guide means comprising a drum rotatably mounted upon said main body of the kneader so that in use the kneaded material is engaged by said drum when it is lifted out of said bowl or receptable by said helix and is guided out of said bowl or receptacle by the rotation of said drum.

2. The kneader of claim 1, wherein said drum is mounted upon said main body adjacent a shaft or journal by way of which said helix is mounted upon said main body, such that part of the periphery of said drum extends beyond the periphery of said bowl or receptacle when said bowl or receptacle is positioned upon said support, said drum and said helix being adapted so as to co-rotate.

3. The kneader of claim 1 which further comprises a member for removing said kneaded material from said guide means.

4. The kneader of claim 2 which further comprises a member for removing said kneaded material from said guide means.

5. The kneader of claim 4, wherein said removing member is in the form of a blade mounted upon said main body of the kneader such that said blade is positioned adjacent said guide means.

6. The kneader of claim 5, wherein said blade is arranged in a vertical orientation, a surface of said blade being inclined at an angle to the outer surface of said guide means.

7. The kneader of claim 6, wherein said blade is of substantially triangular cross-section.

8. The kneader of claim 4 wherein said kneader further comprises a support member for supporting kneaded material upon removal thereof from the kneader.

9. The kneader of claim 8, wherein said support member is in the form of a planar member mounted upon said main body so as to extend adjacent a rim of said bowl or receptacle, when said bowl or receptacle is mounted in position on said support, said planar member extending in the same plane as an opening defined by said rim.

10. A kneader of claim 9, wherein said support member is formed with an edge of the same configuration as that of said rim, said edge being located immediately adjacent said rim.

11. The kneader of claim 4 which further comprises a rigid finger secured to a part of said main body so as to extend into said bowl or receptacle when said bowl or receptacle is positioned upon said support.

12. The kneader of claim 11, wherein said rigid finger is secured to said main body so as to extend into said bowl or receptacle when said bowl or receptacle is position upon said support.

13. The kneader of claim 7 which further comprises a support member for supporting kneaded material upon removal thereof from the kneader.

14. The kneader of claim 13 wherein said support member is in the form of a planar member mounted upon said main body of said kneader so as to extend adjacent a rim of said bowl or receptacle, when said bowl or receptacle is mounted in position on said support, said planar member extending in the same plane as an opening defined by said rim.

15. The kneader of claim 14, wherein said support member is formed with an edge of the same configuration as that of said rim, said edge being located immediately adjacent said rim.

16. The kneader of claim 15 which further comprises a rigid finger secured to a part of said main body so as to extend into said bowl or receptacle when said bowl or receptacle is positioned upon said support.

17. The kneader of claim 16, wherein said rigid finger is secured to said main body so as to extend into said bowl or receptacle in a direction parallel to the axis of rotation of said helix, said finger being adjacent said helix.

18. The kneader of claim 4 further comprising a drive means to rotate said bowl or receptacle.

19. The kneader of claim 9 further comprising a drive means to rotate said bowl or receptacle.

20. The kneader of claim 17 further comprising a drive means to rotate said bowl or receptacle.

* * * * *